May 24, 1960

H. L. SEIDEN 2,938,086

RESETTING MEASURING CONTROL

Filed Oct. 3, 1958

INVENTOR.
Herman L. Seiden
BY
Attorney

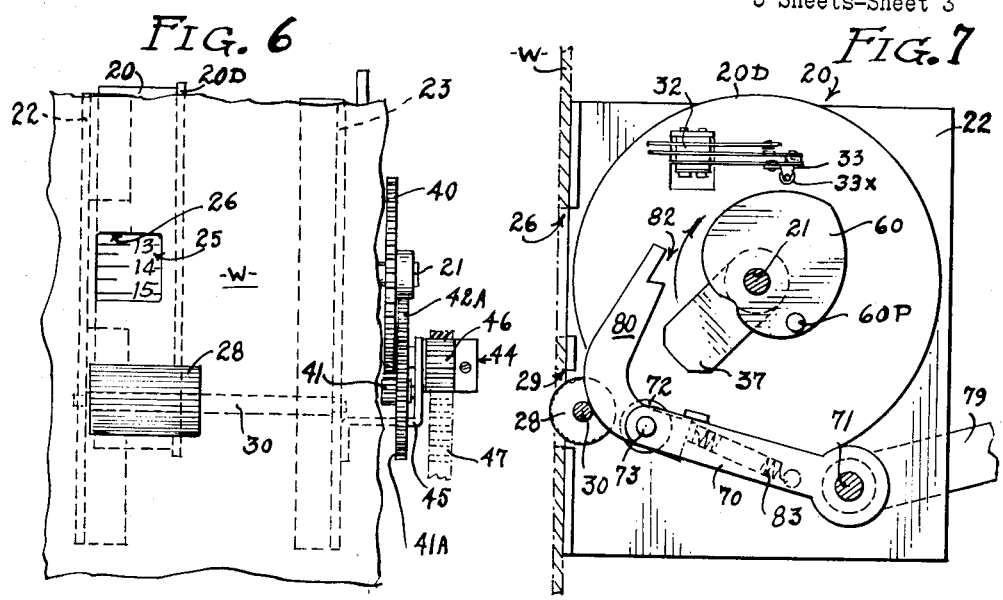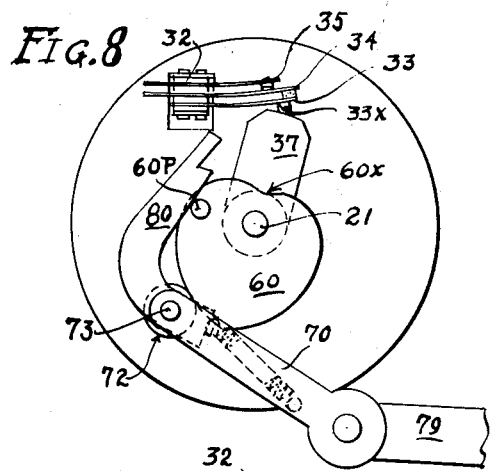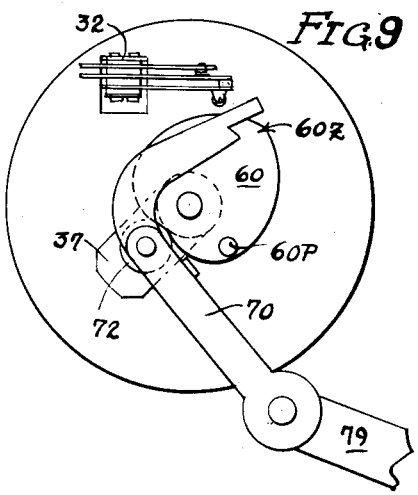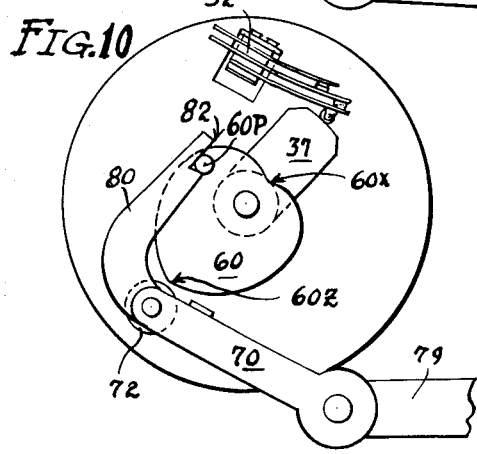

United States Patent Office 2,938,086
Patented May 24, 1960

2,938,086

RESETTING MEASURING CONTROL

Herman L. Seiden, Chicago, Ill., assignor to Lectromatic Devices, Inc., Chicago, Ill., a corporation of Illinois Filed Oct. 3, 1958, Ser. No. 765,200

6 Claims. (Cl. 200—38)

This invention has as its principal object the provision of improvements in a resettable measuring unit for use in sheet-feeding and tape-feeding machines, such as disclosed in a copending application Serial No. 745,165, filed June 27, 1958, utilizing the unit herein described.

The novel measuring unit includes a rotatable dial or drum having numbers thereon indicating desired lengths to be fed, with a switch positioned away from a starting position such that turning the dial to select a desired length moves the switch a proportionate distance from the starting position and a concentrically rotatable switch-operating lever is moved by the sheet or tape-feeding mechanism to operate the switch when the desired length has been run off.

A heart cam drives the switch lever back to a zero starting position at the conclusion of each feeding and measuring cycle through a simplified resetting means.

A further feature of the device resides in the provision of anti-dead center means automatically operable in each cycle to prevent the heart cam from resting in a dead-center position.

Still another feature is the provision of a novel structural and functional layout of the measuring dial, switch lever, resetting cam, and associated driving and dead-center means, and a planetary ratio-changing gear shift mechanism in a compact, economical, and easily serviced unit adaptable to a variety of applications.

Additional objects and aspects of novelty and utility relate to details of the construction and operation of the embodiment illustrated and described in view of the annexed drawings, in which:

Fig. 6 is a fragmentary front elevation of the front wall of a sheet-feeding machine with the new measuring unit mounted therebehind;

Fig. 7 is an approximately median section through the unit shown in Fig. 6, with parts seen in elevation;

Figs. 8, 9, and 10 are operating details based on the view of Fig. 7.

Figure 2:
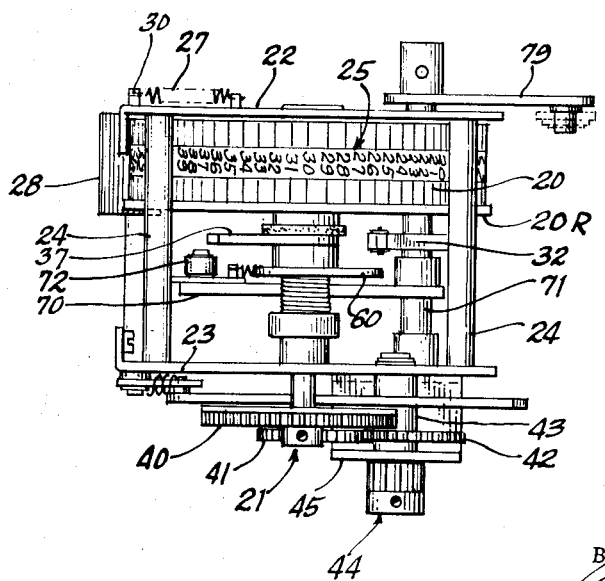
Fig. 2 is a top plan view of the same.
Figure 5:
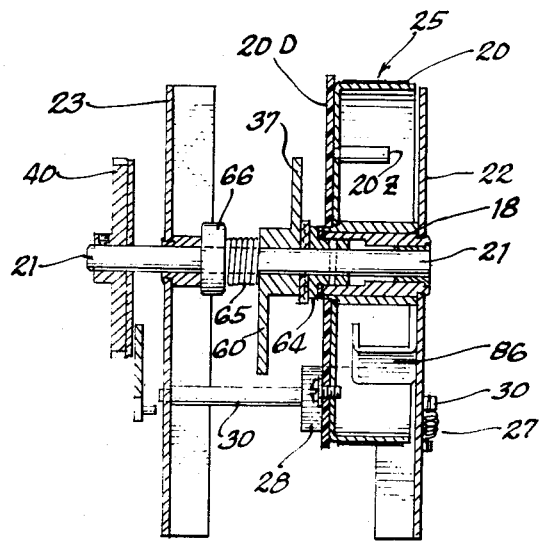
Fig. 5 is a cross-section looking in the direction of lines 5—5 of Fig. 1.

Referring first to Figs. 2 and 5, the measuring unit consists of a rotatable number dial or drum 20 floating on a hub 18 (Fig. 5 only) staked into one of a pair of chassis plates 22, 23 joined in spaced assembly by spacer studs 24.

A long shaft 21 is journalled at one end in the chassis plate 23 and at its opposite end in a free bore in the hub 18, so that the dial may be turned independently of the shaft 21.

The dial drum has a series of measuring or length-indicating numbers 25 on its periphery (usually designating lengths in inches) adapted to be viewed, as in Fig. 6, through a window 26 in the front wall W of a sheet-feeding or like machine (not shown) in which such measuring unit is installed.

Figure 3:
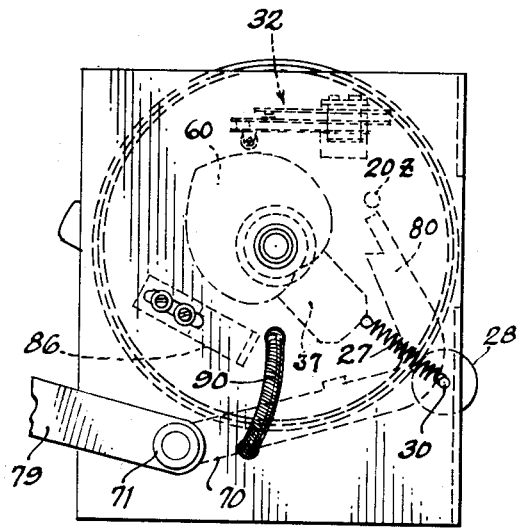
Fig. 3 is a side elevation opposite from that of Fig. 1.

As seen in Figs. 7, 6, and 2, the dial 20 has attached to one side thereof an oversized rim disc 20D, preferably a disc of Bakelite or the like, the extending rim of which is drivingly engaged by a knurled thumbing roller 28 carried on a small cross shaft 30 so as to be exposed through a suitable opening 29 in the wall of the machine housing (Fig. 7), the dial being selectively moved by thumbing of the knurled roller, which is urged against said rim (Figs. 3 and 5) by a spring 27 engaging its shaft 30.

Carried on the outside face of the rim disc (Fig. 7) is a measuring switch 32 preferably in the form of a leaf-spring stack switch, one of the contact blades 33 of which is provided with a roller 33X positioned to be engaged by the end of a switch-operating lever 37 on a heart cam hub 61 floating on the main shaft 21. Switch 32 is adapted to be connected in a suitable control circuit (not shown) for stopping the feeding action of the appertaining sheet or tape-feeding machine with which it is used upon movement of the switch blade 34 into circuit-closing engagement (e.g. as when used in a relay circuit) with a companion blade 35, as in Fig. 8.

Figure 1:
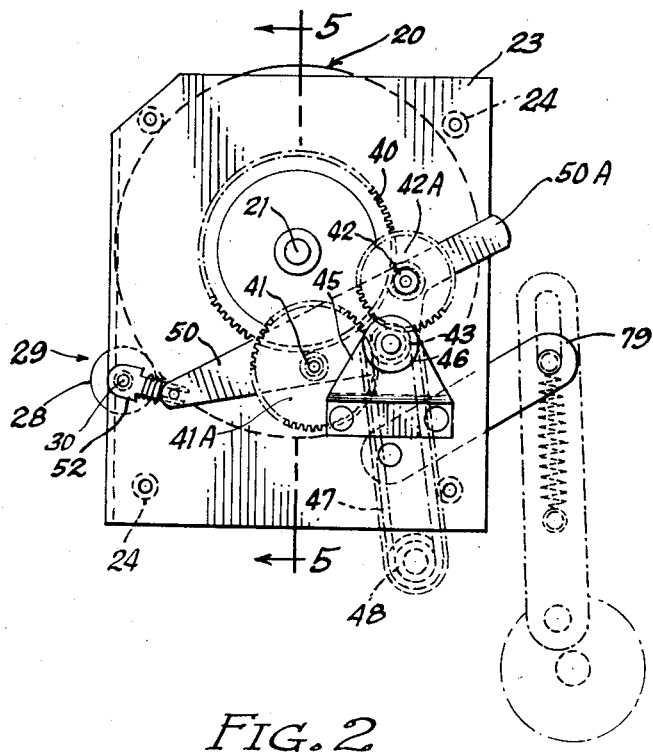
Fig. 1 is a side elevation of the measuring unit.

Switch lever 37 is rotated by turning of main shaft 21 through a train of gears including a driven gear 40 (Figs. 1, 2, and 6), one or the other of two sets of planetary intermediate ratio gears and pinions 41—41A or 42—42A, and a driving pinion 43 constantly in mesh with the two planetary gears 41, 42.

The driving pinion 43 is carried on a stud shaft 44 journalled in the side plate 23 and a small bracket 45 attached thereto. As seen best in Figs. 2 and 6, the stud shaft has a belt pinions 46 fixed thereon outside the bracket over which will be trained a small gear belt 47 (Figs. 1 and 6) to be driven from a master pinion 48 which is part of the sheet-feeding machine and which will be rotated in synchronous ratio with the sheet-feeding rollers, so that the large driven gear 40 for the switch lever shaft will be turned away from a starting position in proper ratio and step with the feeding of the sheet material.

The ratio of the driving system for this gear 40 is selectable to increase the basic range of the measuring dial on a desired basis, for example 2:1; in other words, the basic range of selections indicated by the numbers on dial 20 may run from 0 to 30 inches in 1-inch steps, when the planetary gear and pinion set 42—42A is in mesh with gear 40; but when the other gear set 41, 41A is in mesh, the range is doubled to yield a 60-inch range, with a corresponding reduction of the ratio by one-half.

The planetary pinion means, including the two gear and pinion sets 41—41A and 42—42A, are carried on a widened gear shift lever 50 which is mounted to rock as part of the planetary system on the stud shaft 44, there being a handle extension 50A exposed for this purpose; and since the lever is concentric with the drive pinion 43, rocking of the lever oppositely will not unmesh either the gear 41 or the gear 42 therewith but at the same time will engage or disengage the appertaining pinion 41A or 42A with the main driven gear 40.

A snap-action is provided for the ratio selector lever 50 at its end opposite handle 50A, by means of an over-center spring toggle 52 engaged at its free end with a pin on the end of said lever, and rockably carried at its opposite end on an extension of the pin shaft which mounts the thumb roller 28. Thus, the selector lever will snap into a locked-in mesh at either dial ratio by pushing the lever handle 50A up or down.

While the position of the dial 20 may be changed after each measuring cycle, it is commonly desired to run off many identical lengths of tape or sheeting, and therefore the dial may often be left standing on one reading; and the measuring switch will therefore always remain in the same position, by reason of which it is necessary to return the switch-actuating lever 37 to a starting position at the end of each measuring cycle.

Means for restoring the switch lever 37 to a starting position at the end of each measuring operation is shown particularly in Figs. 2 and 5 in the form of a heart cam 60 having a hub portion 61 to which is affixed the switch lever 37 to float freely on shaft 21.

The hub 61 of the combination switch lever and heart cam 37—60 is driven through a slip-clutch means consisting of a friction disc 64 (Fig. 5) abutting the inside end of the fixed dial hub 18, and against which the hub 61 is drivingly pressed by a coil spring 65 expanding against a part 66 which rotates with shaft 21 whenever the latter is turned by gear 40.

Thus, the heart cam and lever 60—37 will turn with shaft 21 through the friction or slip-clutch drive, or conversely, the cam and switch lever unit may be turned independently of the shaft and gear 21—40 if the latter is held fast, as during the resetting operation, it being also recalled here that the dial drum 20 is rotatable independently of both the shaft 21 and lever and cam 37—60.

Figure 4:
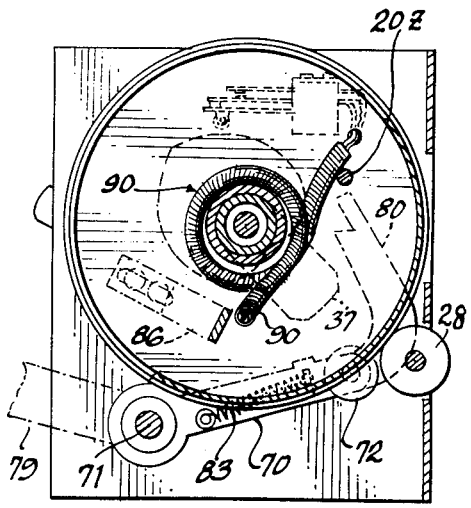
Fig. 4 is a vertical section through the unit as seen in Fig. 3.

The resetting is effected by the means shown first in Figs. 4 and 2, and consisting of a reset lever 70 pivoted on a cross shaft 71 journalled in the two chassis plates, said lever having at its free end a roller 72 engageable with the periphery of the heart cam in such manner as to rotate the cam when the reset lever is pivoted to bring said roller to bear thereon, as shown in Fig. 8. The means for actuating the reset lever 70 may be varied, but in the embodiment disclosed in the previously-mentioned patent application is a lever 79 adapted to be moved by the sheet cut-off knife (not illustrated) which is part of the sheet-feeding machine upon each cutting operation thereof.

The beginning of a resetting operation is illustrated in Fig. 8 wherein the switch lever 37 is shown advanced into operative engagement with the stopping switch as at the conclusion of a measuring cycle.

Since the measuring operation is at an end, the measured web of sheeting or tape will be automatically cut by the feeding machine, and as explained above, the lever 79 will be moved by the cut-off knife as the latter completes its cutting stroke or returns to a starting position, and this or some other driving means will move lever 79 to rock the reset lever 70 and press its roller 72 against the rim of the heart cam causing the latter to rotate until the roller drops into the dwell cleft 60X on the cam, stopping the drive in the condition shown in Fig. 9. This is the zero or starting position for the cam and hence for the switch lever 37.

Should the lobe 60Z of the heart cam stop exactly in radial alignment with the roller 72, a dead-center condition would exist and prevent any displacement of the cam. This condition would render the device inoperative, and it is automatically eliminated by action of a dead-center lever means actuated in every cycle concomitantly with the resetting movement of lever 70, said dead-center lever means including a dog-leg lever 80 pivoted at one end on the same pivot pin 73 employed to journal the cam roller 72 on the reset lever.

The opposite or free end of the dog-leg anti-dead-center lever is provided with a stepped notch 82 (Fig. 7) disposed so that in each advancing stroke of this lever toward the heart cam it will engage an eccentric pin 60P on this cam and advance the latter a small amount sufficient to carry the lobe 60Z away from dead-center opposition to roller 72.

The anti-dead-center lever is held yieldingly in a predetermined pivotal attitude relative to the reset lever by a spring 83 (Fig. 4 particularly) attached to the two levers.

The aforesaid resetting operation of the heart cam is effected without movement of the shaft 21 or the dial 20, the former being held stationary by immobility of the gear 40; and the drum 20 being held stationary by the frictional pressure of the thumb roller 28.

The dial 20 is not permitted to make more than one (nearly) complete revolution, owing to the provision of stop pin 20Z on the inside thereof engageable with an adjustable bracket stop 86 (Figs. 3, 4, 5) carried on the adjacent chassis plate.

Electrical connections to the control or stopping switch 32 are carried out through a lead-out coil spring 90 coiled around the dial hub (Fig. 4) and extended out through a hole in the chassis plate 22.

I claim:

1. In a measuring unit, a selector dial rotatable to selecting positions; a control switch carried by said dial radially of its axis of rotation; a combination switch-operating lever and heart cam rotatable concentrically of said axis but independently of said dial, said lever being rotatively positioned to operatively engage and actuate said switch at any selected position of the latter determined by a selecting position of said dial; drive means acting through a slip coupling with said combination lever and cam to rotate the same to actuate the switch as aforesaid; and means including a rockable reset lever and roller movable to press against said heart cam and turn the same to a predetermined angular starting position relative said switch about said axis.

2. Mechanism according to claim 1 further characterized by the provision of anti-dead-center means for angularly shifting the cam as a function of each said resetting operation, said means comprising a dead-center lever moved concomitantly with said reset lever in a radial direction to said axis and engageable with a radially disposed part located on said cam to turn the latter whenever the sam stops in a predetermined dead-center position in relation to said reset lever.

3. Apparatus according to claim 2 further characterized in that said dead-center lever is pivoted on said reset lever and is spring-urged into a yieldably predetermined position relative thereto so as to be yieldingly disposed in a certain approach position to engage said radially-disposed part on the heart cam.

4. In a measuring unit for controlling an electrically-driven sheet-feeding machine; a gear-driven shaft adapted for driving connection in feeding step with said machine; a length-indicating selector drum floating on said shaft and manually settable to selected positions; a control switch on a side of said drum for angular displacement therewith relative to a starting position; a combination member including a concentric heart cam and switch-actuator floating on said shaft alongside said drum and switch; slip-clutch means acting between said shaft and combination member to drive the latter with gear-driven motion of the shaft and permitting independent displacement of the combination member; a reset lever movable drivingly against the heart cam to reset the latter from displaced back to starting position; and an anti-dead-center lever pivotally carried by said reset lever and including spring means acting with said levers to urge the dead-center lever in a direction for driving engagement in dead-center condition with a part carried by said cam as a function of resetting motion of the reset lever, but in advance of effective resetting engagement of the reset lever with the cam whereby to prevent resetting failures owing to dead-center condition.

5. In a resettable measuring unit of the type having a reversely rotatable length-selecting drum selectively settable in either direction to preselect a desired measurement; and a control switch movable therewith and positionable thereby selected angular distances away from an index position; improvements in switch-actuating and indexing means comprising, namely: a switch-operating member rotatable coaxially of said drum in position to engage and operate said switch in any of its angularly set positions; drive means adapted for coaction with mechanism to be controlled by said switch, said drive means having an impositive driving connection with said switch-operating member to displace the latter angularly responsive to operation of said drive means; and reset means including a heart cam rotatable coaxially in step with said switch-operating member; and a reset cam-driving lever pivoted for movement to bear in a radial direction against the periphery of said heart cam to drive the latter from all displaced positions except dead-center on the heart cusp, back to an indexed starting position determined by the heart inflection; and a further lever means coacting with said cam-driving lever to nudge the heart cam out of dead-center position in any resetting operation.

6. A preselective measuring control comprising a rotatable indicia-bearing selector member manually movable into desired selecting positions corresponding to indicia thereon; control switch means carried by said selector member and positioned angularly about the rotative axis thereof into selected control positions; combination control and reset means including an angularly movable switch-actuating member and coaxially movable reset heart cam, and means mounting the same in juxtaposition to said switch means and the path of angular selective movement thereof determined by selective positioning of the selector member as aforesaid, such that said switch means can be actuated by said switch-operating member in angular travel relative thereto; driven means adapted to be connected to and moved angularly in step with a desired electrically-operated, angularly-movable instrumentality to be controlled by said switch means; means providing a releasable driving coupling between said driven means and combination control and reset means for moving the latter angularly in step with operation of said instrumentality while permitting relative free reset movement of said combination means independently of said driven means; a reset member mounted adjacent said cam for resetting movement radially against the cam to drive the latter into a starting position corresponding to engagement of said member in the dwell cusp of the cam heart; said reset member being adapted for operative connection to an operating agency for resetting movement thereby as aforesaid; and means moved radially by said reset member into driving engagement with a radially-disposed part carried by said heart cam to move the latter angularly a substantial amount whenever said reset member engages said cam in dead-center relation in resetting action as aforesaid.

References Cited in the file of this patent

UNITED STATES PATENTS

| | | |
|---|---|---|
| 2,121,179 | Sweetland | June 21, 1938 |
| 2,249,237 | Fulton | July 15, 1941 |
| 2,396,523 | Nelson | Mar. 12, 1946 |
| 2,523,602 | Telford | Sept. 26, 1950 |
| 2,560,516 | Mueller | July 10, 1951 |

FOREIGN PATENTS

| | | |
|---|---|---|
| 684,110 | France | Mar. 11, 1930 |

UNITED STATES PATENT OFFICE

CERTIFICATE OF CORRECTION

Patent No. 2,938,086                                      May 24, 1960

Herman L. Seiden

It is hereby certified that error appears in the printed specification of the above numbered patent requiring correction and that the said Letters Patent should read as corrected below.

Column 4, line 37, for "sam" read -- cam --.

Signed and sealed this 22nd day of November 1960.

(SEAL)
Attest:
KARL H. AXLINE
Attesting Officer

ROBERT C. WATSON
Commissioner of Patents